United States Patent
Mueller et al.

(10) Patent No.: US 9,448,357 B2
(45) Date of Patent: Sep. 20, 2016

(54) ILLUMINATED FACADE ARRANGEMENT

(75) Inventors: Marco Mueller, Waldfeucht (DE);
Rino Messere, Modave (BE)

(73) Assignee: SAINT-GOBAIN GLASS FRANCE,
Courbevoie (FR)

(\*) Notice: Subject to any disclaimer, the term of this patent is extended or adjusted under 35 U.S.C. 154(b) by 92 days.

(21) Appl. No.: 14/110,909

(22) PCT Filed: Feb. 10, 2012

(86) PCT No.: PCT/EP2012/052256
§ 371 (c)(1),
(2), (4) Date: Mar. 20, 2014

(87) PCT Pub. No.: WO2012/139787
PCT Pub. Date: Oct. 18, 2012

(65) Prior Publication Data
US 2014/0218934 A1   Aug. 7, 2014

(30) Foreign Application Priority Data
Apr. 11, 2011   (EP) ...................................... 11161828

(51) Int. Cl.
*F21V 8/00* (2006.01)
*B32B 17/10* (2006.01)
(Continued)

(52) U.S. Cl.
CPC ....... *G02B 6/0095* (2013.01); *B32B 17/10055* (2013.01); *B32B 17/10174* (2013.01); *F21V 33/006* (2013.01); *F21W 2131/405* (2013.01); *F21Y 2103/003* (2013.01); *G02B 6/0073* (2013.01); *G02B 6/0083* (2013.01)

(58) Field of Classification Search
CPC .................. B32B 17/10055; B32B 17/10045;
B32B 17/10064; B32B 17/10541; B32B 17/10165; B32B 17/10073; B32B 17/10036; G02B 6/0065; G02B 6/0095; F21V 33/0016
See application file for complete search history.

(56) References Cited

U.S. PATENT DOCUMENTS 4,643,944 A * 2/1987 Agethen ........... B32B 17/10018
156/106
6,185,883 B1   2/2001 Howard
(Continued)

FOREIGN PATENT DOCUMENTS

DE   29510238   11/1995
DE   29706568   8/1997
(Continued)

OTHER PUBLICATIONS

PCT International Search Report mailed on Apr. 17, 2012 for PCT Application PCT/EP2012/052256 filed on Feb. 10, 2012 in the name of Saint-Gobain Glass France.
(Continued)

*Primary Examiner* — Robert May
(74) *Attorney, Agent, or Firm* — Steinfl & Bruno LLP (57) ABSTRACT

An illuminated window arrangement having insulating glazing is described. The illuminated window arrangement has:
composite glass pane,
at least one circumferential connection element between the composite glass pane and a lower pane, and
LED housing fastened to a side edge of the lower pane, an LED printed circuit board fastened to the LED, an electrical connector fastened to the LED printed circuit board, and sheathing of the LED, the LED printed circuit board, and the electrical connector.

14 Claims, 5 Drawing Sheets

(51) Int. Cl.
*F21V 33/00* (2006.01)
*F21W 131/405* (2006.01)
*F21Y 103/00* (2016.01)

(56) References Cited

U.S. PATENT DOCUMENTS

| | | | | |
|---|---|---|---|---|
| 7,347,608 B2* | 3/2008 | Emde | ................ | B32B 17/10045 362/234 |
| 2004/0031234 A1* | 2/2004 | Emde | ....................... | F21S 11/00 52/786.11 |
| 2004/0040228 A1 | 3/2004 | Emde et al. | | |

FOREIGN PATENT DOCUMENTS

| | | | |
|---|---|---|---|
| DE | 19852593 | 5/2000 | |
| DE | 10224421 | 4/2004 | |
| DE | 102005036869 | 2/2007 | |
| DE | 102005061855 | 7/2007 | |
| DE | 102008009774 | 8/2009 | |
| EP | 1 106 915 A1 | 6/2001 | |
| EP | 1346178 | 9/2003 | |
| EP | 1379742 | 1/2004 | |
| JP | H07237941 A | 9/1995 | |
| JP | 2004526077 A | 8/2004 | |
| JP | 2006143525 A | 6/2006 | |
| JP | 2011187091 A | 9/2011 | |
| WO | 02/052192 | 7/2002 | |
| WO | 02052191 A1 | 7/2002 | |
| WO | WO 2004007887 A1 * | 1/2004 | .......... B44C 5/0407 |
| WO | 2006/065049 | 6/2006 | |
| WO | 2007/077099 | 7/2007 | |
| WO | 2010124951 A2 | 11/2010 | |
| WO | 2011/026728 | 3/2011 | |

OTHER PUBLICATIONS

Written Opinion for PCT application PCT/EP2012/052256, filed on Feb. 10, 2012, in the name of Saint-Gobain Glass France. Mailed on: Apr. 17, 2012. English translation and German original.

* cited by examiner

ILLUMINATED FACADE ARRANGEMENT

CROSS REFERENCE TO RELATED APPLICATIONS

The present application is the US national stage of International Patent Application PCT/EP2012/052256 filed on Feb. 10, 2012 which, in turn, claims priority to European Patent Application EP 11161828.6 filed on Apr. 11, 2011.

The invention relates to an illuminated double or triple glazing, a façade constructed of the illuminated double or triple glazing, a method for producing the double or triple glazing, and use thereof.

Illuminated window arrangements include panes and lighting means mounted directly on the edge of the panes. Reflective elements mounted on the pane surface enable the homogeneous illumination of the pane area. Thus, interior spaces and also exterior building façades can be very uniformly illuminated. Illuminated window arrangements are found in a large number of areas of application inside and outside buildings and motor vehicles.

In contrast to a point light source, such as a floor lamp or ceiling lamp, a very uniform, area, ambient light can be generated by an illuminated window arrangement. Depending on the illumination source and the activation electronics used, different light effects can also be realized. In particular, with the use of colored LEDs, different color effects can be combined. Thus, moving light effects can be generated through targeted activation and extinguishing of individual LEDs. For the observer, the light seems to spread out in waves of color. If multiple waves of color overlay each other, further effects such as a colored so-called moiré effect are produced. These light and color effects can also be used for advertising spaces or to generate artistic and architectonic effects.

For radiation of the light out of the pane, light reflectors mounted on the pane are necessary. For this, the pane can be printed on or provided with corresponding incisions. Since the light of the LEDs is coupled on the sides, a large proportion of the incident light is often lost. With use in double and triple glazings, the installation of the light reflectors, which not insubstantially increases the cost of the process, must be taken into account. In addition, the type of glazing quite substantially affects the amount of light radiated by the pane.

DE 295 10 238 U1 discloses a window with light projecting means or light guides mounted in the edge region. Reflectors, light deflecting means, mounted on the window enable radiation of the light coupled into the window. Possible light sources include incandescent bulbs, fluorescent tubes, or LEDs.

DE 198 52 593 A1 discloses a panel light with transparent glazing. When the light source is turned off, the pane is transparent. When the light source is turned on, the glazing functions as an area light.

DE 102 24 421 A1 discloses a light wall with lamps that is arranged behind a computer workstation. The light wall consists of a transparent glass or plastic pane, preferably illuminated by LEDs. The brightness and color components can be regulated by a control unit. The control unit can be directly connected to the PC of the computer workstation and can regulate the brightness of the workstation as a function of the brightness of the monitor.

EP 1 379 742 B1 discloses an illuminated urban furnishing with windows in a frame structure. The lighting means are disposed on the front face of the window and radiate the incident light perpendicularly outward. A similar arrangement is also found in EP 1 106 915 A1.

EP 1 346 178 B1 discloses a sandwich-like panel element. The two panels are largely transparent to light. Solar cell elements are mounted in the intermediate space of the panel or on the panels. A light source is arranged on the front face of at least one panel and enables additional illumination.

DE 10 2005 061 855 A1 discloses a glass element as part of a façade with a long afterglow effect. The long afterglow element has a long afterglow pigment in a matrix.

DE 10 2005 036 869 A1 discloses a multilayer composite structure for covering interiors or exteriors of buildings or parts of buildings. The composite structure comprises at least one transparent rigid layer, a plurality of light conductive fibers, and one or a plurality of connectors for connection of the light conductive fibers to a light source.

U.S. Pat. No. 6,185,883 B1 discloses a window with decorative elements. The window frame includes a triple insulating glazing with decorative elements in the middle pane.

For radiation of the light out of the pane, light reflectors mounted on the pane are necessary. For this, the pane can be printed on with a bright ceramic layer or provided with corresponding incisions. Since the light of the LEDs is coupled on the sides, a large proportion of the incident light is often lost. With use in triple glazings, the installation of the light reflectors and especially the light source must, consequently, be taken into account. Triple glazings, in particular in façades, are usually accessible only with difficulty for maintenance work. In particular, the light strips are frequently an integral part of the glazing, which is difficult to access or to reach.

The object of the invention is to provide a glazing on which an LED strip can be mounted and maintained without measures to reconstruct the glazing being necessary. The glazing should also radiate the greatest possible amount of light from the pane surface. Also, the installed electronic light sources and their feed lines must be implemented very long-lasting and robust. To that end, they should have a protection class in accordance with DIN EN 60529 of at least IP64, preferably IP67.

A façade according to the invention, a method for producing the illuminated window arrangement, and the use of the window arrangement according to the invention emerge from other independent claims.

The illuminated insulating glazing according to the invention comprises at least one composite glass pane and a lower (outer) pane. A circumferential (frame-like) connection element between the composite glass pane and the lower pane forms the basic structure of the insulating glazing. The connection element can, optionally, also be implemented in the form of two (connectable) connection elements. The panes contain materials such as glass and/or transparent polymers. The panes preferably have an optical transparency of >85%. In principle, various geometries of the panes are possible, for example, rectangular, trapezoidal, and rounded geometries. An LED housing is fastened to the side edge of the lower pane. The LED housing contains at least one LED, one LED printed circuit board (PCB) fastened to the LED, and one electrical connector fastened to the LED printed circuit board. The LEDs preferably include LEDs (light emitting diodes) and/or OLEDs (organic light emitting diodes). The LED printed circuit board includes commercially available PCBs and/or cards. These are made of electrically insulating materials on which electrical connections are mounted. Examples of insulating materials are nonconductive polymers such as epoxy-resin-impregnated glass fibers, Teflon, ceramic, and/or polyester film. The electrical connections, for example, conducting wires, contain preferably copper, iron, tin, nickel, gold, silver, and/or alloys thereof. The LEDs are fastened to the LED printed circuit boards and make contact via the electrical connections. The electrical connector represents the connection to the power source. Preferably, a control device is also arranged between the electrical connector and the power source. This control device enables targeted illumination of individual LEDs. Through the arrangement of different colored LEDs on the LED printed circuit board, colored light effects can be generated. The entire arrangement of the components made up of LED, LED printed circuit board, and electrical connector is situated inside sheathing. This sheathing can be implemented as a flexible or rigid housing. The LED housing is connected to the side edge of the lower pane via an optically transparent adhesive and/or adhesive tape.

A reflector is preferably disposed between the connection element adjacent the LED housing and the lower pane. The reflector comprises bright coats of paint, for example, ceramic paint and bright polymer or metal bodies. The reflector prevents or reduces light loss in the region of the connection elements.

The composite glass pane preferably comprises an upper pane, an adhesive layer, and a middle pane. The adhesive layer preferably contains PVB (polyvinyl butyral) and/or EVA (poly-ethylvinyl acetate). The adhesive layer optionally contains a polyester film, preferably polybutylene terephthalate (PBT), polycarbonate (PC), polyethylene terephthalate (PET), and polyethylene naphthalate (PEN), and/or mixtures and/or copolymers thereof. The adhesive layer can include a plurality of layers of the same or different polymers.

The composite glass pane and/or the middle pane preferably have a thermal protection coating. The thermal protection coating preferably contains silver.

The insulating glazing preferably has an optical transparency of >60%, preferably of >75%, particularly preferably of >85%. The term "optical transparency" describes, in the context of the invention, a mean optical transmission in the wavelength range from 400 nm to 800 nm (VIS range).

The lower pane preferably contains luminous fields. The luminous fields reflect, emit, or diffuse the light coupled into the upper pane by the LEDs outward. When only individual luminous fields are disposed on or in the lower pane, the pane lights only in the region of the luminous fields. When the entire radiating surface of the lower pane is provided with reflectors, the entire lower pane on the opposite side lights accordingly.

The luminous fields preferably include structures for diffusion of light, particularly preferably particles, dot patterns, etched surfaces, stickers, deposits, indentations, incisions, line patterns, overprints, and/or screen prints.

This sheathing preferably contains an optically transparent polymer, particularly preferably polyurethanes, silicones, polyisoprenes, styrene-butadiene rubber, butadiene acrylonitrile rubber, and/or polyacrylates as well as mixtures and/or copolymers thereof.

The silicones preferably include RTV (room temperature vulcanizing) silicone rubber, HTV (high temperature vulcanizing) silicone rubber, peroxide vulcanizing silicone rubber, and/or addition vulcanizing silicone rubber as well as mixtures and/or copolymers thereof.

The LED housing is preferably fastened to the side edge of the lower pane with an optically transparent adhesive and/or adhesive tape. The selection of the adhesive on the adhesive tape is guided by the material of the pane or of the sheathing. The optically transparent adhesive tape preferably contains a silicone-based adhesive on the side facing the sheathing and an acrylate-based adhesive on the side facing the pane. Thus, for example, sheathing made of silicone can be fixedly connected to a pane made of glass or polyacrylic. The optically transparent adhesive tape is preferably activated by a corona discharge.

The LED housing is preferably non-loadbearingly connected to the lower pane. The term "non-loadbearingly" means, in the context of the invention, that the LED housing is not in direct contact with the possible mounting devices of the illuminated triple glazing. The LED housing is preferably part of the non-loadbearing structure and thus does not itself contribute to the stability. This non-loadbearing assembly enables simple exchange and maintenance of the LED housing.

An optically transparent adhesive and/or adhesive tape preferably contains acrylate adhesives, methyl methacrylate adhesives, cyanoacrylate adhesives, polyepoxies, silicone adhesives, and/or silane cross-linking polymer adhesives as well as mixtures and/or copolymers thereof.

An optically transparent adhesive and/or adhesive tape preferably has an optical transparency of >80%, particularly preferably >90%.

The LEDs preferably have a distance from the upper pane of <1 mm, preferably <0.5 mm.

The LED printed circuit board preferably contains silver, copper, tin, nickel, gold, aluminum, iron, tungsten, chromium, and/or alloys thereof and/or an electrically conductive adhesive tape.

The connection elements preferably have a width of 5 mm to 20 mm and a height of 5 mm to 10 mm. The height is determined along the edge of the connection element pointing toward the composite pane and/or lower pane. The width is measured along the edge to the intermediate space between the composite glass pane and the lower pane. The connection elements are preferably implemented in block or cube shape. The connection elements preferably contain polymers and/or metals.

The LED housing preferably has a recess for a cable. The recess enables the space-saving arrangement of a plurality of LED housings or LED strips in a row on a relatively long glass pane. Additionally, no additional space in the sheathing is required with the cable guided through the recess.

Das LED housing preferably has a structural height less than 10 mm, preferably less than 8 mm. In a façade structure, this enables very compact construction.

The invention further includes an illuminated façade arrangement, wherein two above-described illuminated triple glazings according to the invention are connected via fastening units to a façade mount. A cover is fastened between the individual insulating glazings to the sides of the insulating glazings turned away from the façade side. The supplying of power to the LED housing inside the illuminated insulating glazing according to the invention takes place via a cable from the LED housing to a (main) power feed inside the cover. The preferably removable cover enables simple exchanging of the LED housing.

The invention further includes a method for producing an illuminated window arrangement. In a first step, an upper pane is connected to a middle pane via an adhesive layer in an autoclave. Subsequently or at the same time, at least one LED on a printed circuit board and an electrical connector are connected to form an LED arrangement. In the next step, the arrangement obtained is provided with a sheathing and an LED housing is obtained. Then, in advance or at the same time, the middle pane and a lower pane are connected via a circumferential connection element. The connection elements are preferably further sealed with gaskets, for example, silicone-based gaskets. In the final step, the LED housing is fastened to the side edge or to the edge of the lower pane via an optically transparent adhesive and/or adhesive tape.

The invention further includes the use of the illuminated window arrangement as an illuminated external façade, building interior illumination, building exterior illumination, advertising medium, and/or a motor vehicle window pane.

In the following, the invention is explained in detail with reference to drawings. The drawings are schematic representations and not to scale. They in no way restrict the invention. The drawings include.

Figure 1:
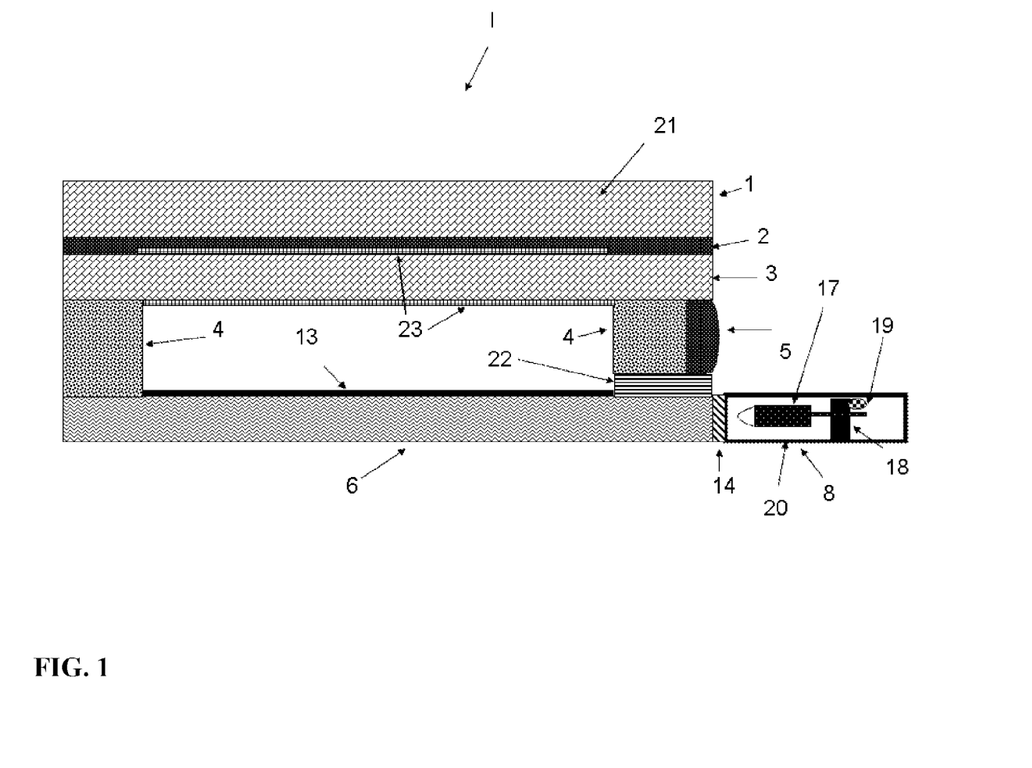
FIG. 1 depicts a cross-section of the illuminated triple glazing (I)

FIG. 1 depicts a cross-section of the illuminated window arrangement (I) according to the invention, consisting of a triple glazing. An upper pane (1) ist connected via an adhesive layer (2) to a middle pane (3) to form a composite glass pane (21). The middle pane (3) is fastened via a circumferential connection element (4) and a gasket (5) to a lower pane (6). The gasket (5) preferably contains a bright light reflecting material. An LED housing (8) is connected via an optically transparent adhesive (14) to the side edge of the lower pane (6). The term "side edge" or "edge" preferably describes, in the context of the invention, the smaller outside edge, perpendicular to the look-through side of the lower pane. An electrical connector (19) provides the LEDs (17) with current. A sheathing (20) made of transparent polyurethane or silicone forms the outer framework of the LED housing (8). Printed-on luminous fields (13), which couple the light radiated from the LED housing (8) outward out of the lower pane (6), are situated on the lower pane.

Figure 2:
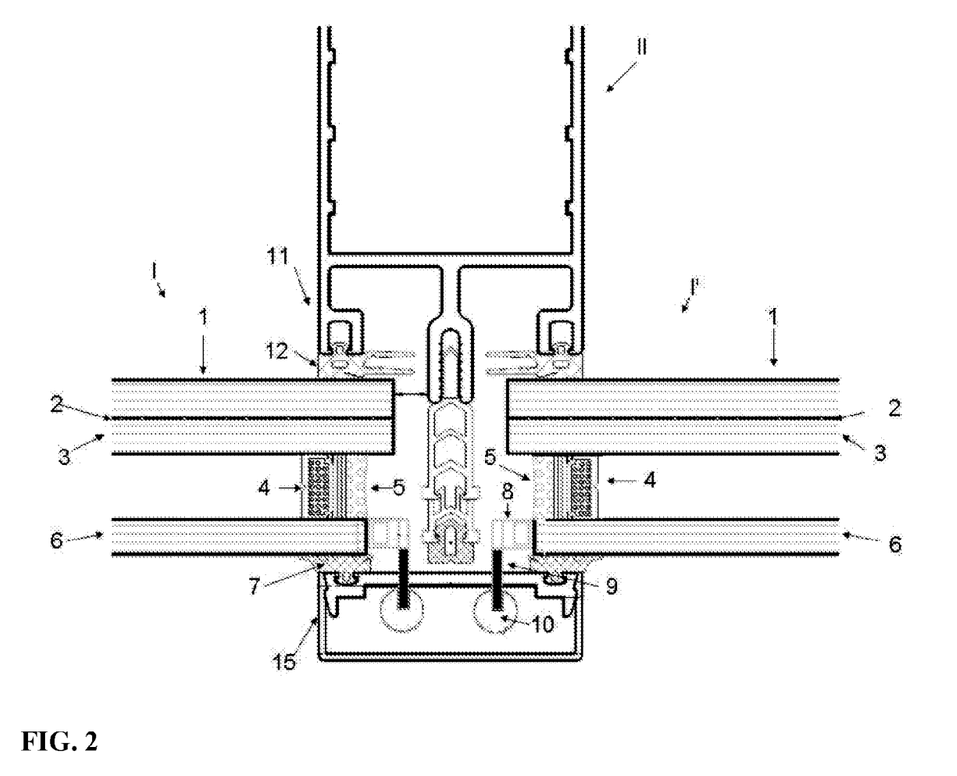
FIG. 2 depicts a cross-section of the illuminated façade arrangement (II)

FIG. 2 depicts a cross-section of the illuminated façade arrangement (II). The window arrangement (I) according to the invention is fastened via a façade mount (11) and fastening units (12) anchored thereon. The structure of the window arrangements (I) corresponds to the arrangement depicted in FIG. 1. The LED housing (8) is provided with current via a cable (9) out of the main cable (10). The main cable (10) lies inside a removable cover (15) connected via an external fastening element (7). The LED housing (8), cable (9), and main cable (10) can be readily exchanged and maintained by removing the cover (15).

Figure 3:
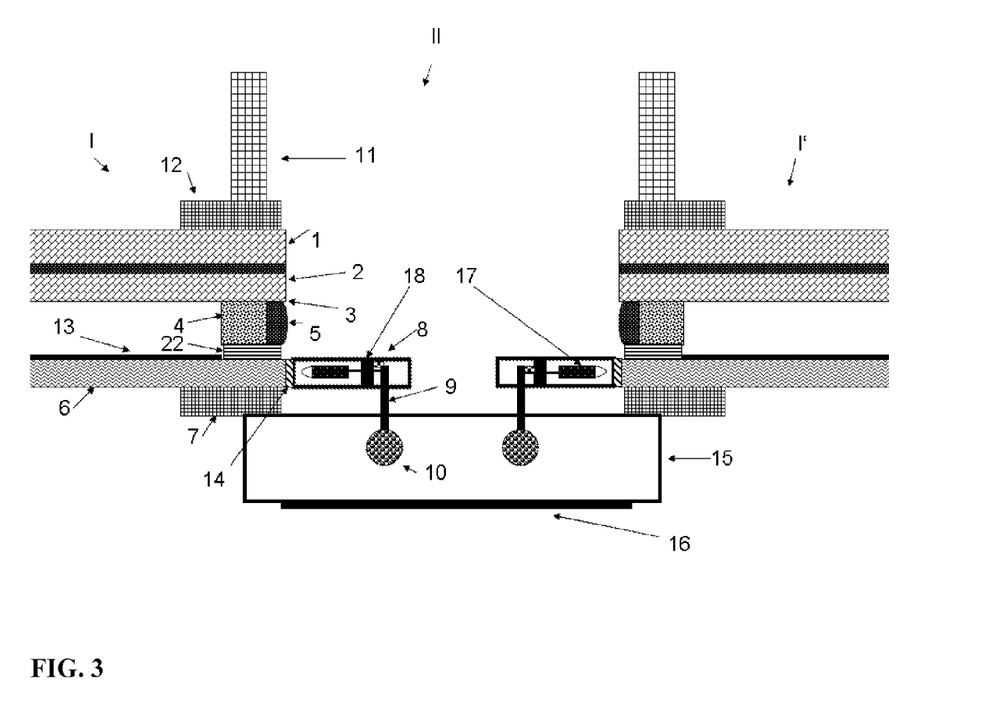
FIG. 3 depicts another, schematic, detailed cross-section of the illuminated façade arrangement (II)

FIG. 3 depicts an enlarged, schematic cross-section of the illuminated façade arrangement. The structure corresponds to that described in FIGS. 1 and 2. The cover can optionally have various reversibly reclosable openings (16).

Figure 4:
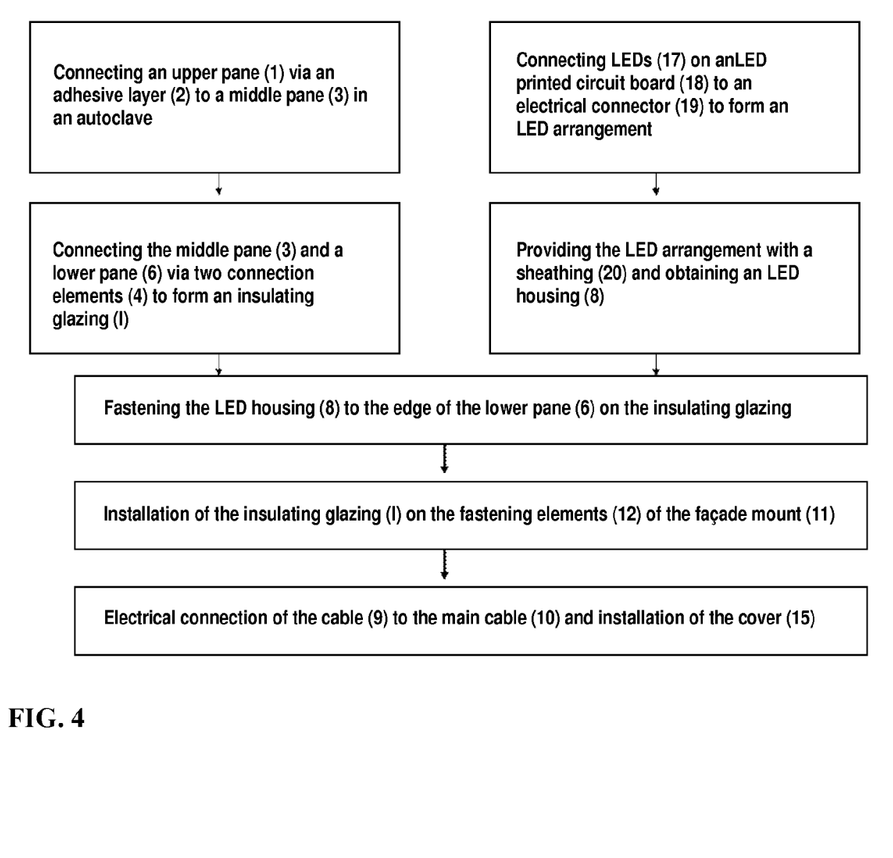
FIG. 4 depicts a flowchart of the method according to the invention.

FIG. 4 depicts a flowchart for producing the illuminated window arrangement (I) according to the invention. In a first step, an upper pane (1) is connected via an adhesive layer (2) to a middle pane (3) in an autoclave. At the same time or subsequently, LEDs (17) are connected to an LED printed circuit board (18) and an electrical connector (19) to form an LED arrangement. In the next step, the arrangement obtained is provided with a sheathing (20) and an LED housing (8) is obtained. Then, the middle pane (3) and a lower pane (6) are connected via a circumferential connection element (4) to form an insulating glazing (I). In the following step, the LED housing (8) is fastened to the edge of the lower pane (6) via an optically transparent adhesive and/or adhesive tape (14). The fastening of the LED housing (8) to the side edge or to the edge of the lower pane (6) prevents a contribution of the LED housing (8) to the load of the insulating glazing (I). This means that the LED housing (8) in a façade arrangement can be exchanged, without the loadbearing elements such as, for instance, the fastening units (12) being influenced or even affected. Then, the insulating glazing (I) is fastened to the fastening elements (12) of the façade mount (11). Finally, the electrical connecting of the cable (9) to the main cable (10) and the installation of the cover (15) take place.

Figure 5:
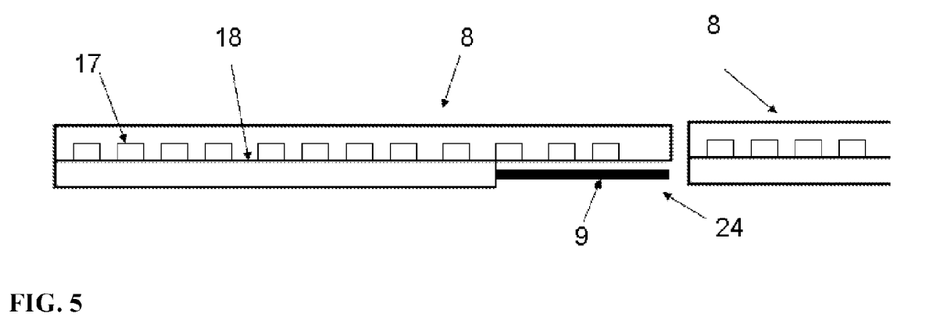
FIG. 5 depicts a cross-section of a preferred embodiment of the LED housing.

FIG. 5 depicts a cross-section of a preferred embodiment of the LED housing (8). The LED housing (8) has a recess (24) for the space-saving arrangement of the cable (9). The recess preferably has a length corresponding to 2% to 10% of the entire length of the LED housing (8). The recess further enables the direct arrangement of a plurality of LED housings (8) along the side edge of the lower pane (6).

The window arrangement and façade arrangement according to the invention surprisingly and unexpectedly permit maintenance of the LEDs without the glazing having to be reconstructed. The arrangement according to the invention is very economical to produce and advantageous to maintain. This was unexpected and surprising for the person skilled in the art.

LIST OF REFERENCE CHARACTERS (1) upper pane
(2) adhesive layer
(3) middle pane
(4) circumferential connection element (spacer)
(5) gasket
(6) lower pane/outer pane
(7) external fastening element
(8) LED housing
(9) cable/connection cable
(10) main cable
(11) façade mount
(12) fastening element
(13) luminous fields
(14) optically transparent adhesive and/or adhesive tape
(15) cover
(16) opening
(17) LED
(18) LED printed circuit board
(19) electrical connector (LED)
(20) sheathing
(21) composite glass pane
(22) reflector
(23) thermal protection coating
(24) recess
(I, I') window arrangement
(II) façade arrangement

The invention claimed is:

1. An illuminated facade arrangement comprising two illuminated window arrangements having insulating glazings, each window arrangement having an insulating glazing comprising:
   a composite glass pane, wherein the composite glass pane comprises an upper pane, an adhesive layer and a middle pane, at least one circumferential connection element between the composite glass pane and a lower pane, and a LED housing fastened to a side edge of the lower pane comprising at least an LED, an LED printed circuit board fastened to the LED, an electrical connector fastened to the LED printed circuit board, and a sheathing of the LED, the LED printed circuit board, and the electrical connector, wherein the LED housing is connected to the side edge of the lower pane via an optically transparent adhesive and/or adhesive tape, wherein the window arrangements are connected via fastening units to a facade mount and a cover fastened between the insulating glazings to a side of the insulating glazings turned away from the facade mount, and wherein a supplying of power to the LED housing takes place via a cable to a power feed in a main cable inside the cover.

2. The facade arrangement according to claim 1, wherein a reflector is disposed between the at least one circumferential connection element adjacent the LED housing and the lower pane.

3. The facade arrangement according to claim 1, wherein the composite glass pane has a thermal protection coating.

4. The facade arrangement according to claim 1, wherein the insulating glazing has an optical transparency of greater than 60%.

5. The facade arrangement according to claim 4, wherein the insulating glazing has an optical transparency greater than 75%.

6. The facade arrangement according to claim 4, wherein the insulating glazing has an optical transparency greater than 85%.

7. The facade arrangement according to claim 1, wherein the lower pane contains luminous fields, preferably particles, dot patterns, line patterns, stickers, deposits, indentations, screen prints, incisions, and/or combinations thereof.

8. The facade arrangement according to claim 1, wherein the sheathing contains a metal, preferably aluminum, titanium, iron, chromium, nickel, tungsten, and/or alloys.

9. The facade arrangement according to claim 1, wherein the sheathing contains at least one polymer, preferably:

i) polyurethanes,
ii) silicones
iii) polyisoprenes,
iv) styrene-butadiene rubber,
v) butadiene-acrylonitrile rubber,
vi) polyacrylates,
vii) mixtures of polymers i)-vi) or
viii) copolymers of any one of polymers i)-vi).

10. The facade arrangement according to claim 9, wherein the silicones comprise:

i) RTV silicone rubber,
ii) HTV silicone rubber,
iii) peroxide vulcanizing silicone rubber,
iv) addition vulcanizing silicone rubber,
v) mixtures of the silicones i)-iv), or
vi) copolymers of any one of the silicones i)-iv).

11. The facade arrangement according to claim 1, wherein the optically transparent adhesive and/or adhesive tape contains:

i) acrylate adhesives,
ii) methyl methacrylate adhesives,
iii) cyanoacrylate adhesives,
iv) polyepoxies,
v) silicone adhesives,
vi) silane cross-linking polymer adhesives,
vii) RTV silicone rubber,
viii) HTV silicone rubber,
ix) peroxide vulcanizing silicone rubber,
x) addition vulcanizing silicone rubber,
xi) mixtures of any one of adhesives i)-x) or
xii) copolymers of any one of adhesives i)-x).

12. The facade arrangement according to claim 1, wherein the at least one circumferential connection element has a width of 5 mm to 20 mm.

13. The facade arrangement according to claim 1, wherein the optically transparent adhesive and/or adhesive tape have an optical transparency of >80%, preferably >90%.

14. The facade arrangement according to claim 1, wherein the LED housing has a recess for a cable.

* * * * *